United States Patent
Orhanen et al.

(10) Patent No.: US 12,189,356 B2
(45) Date of Patent: Jan. 7, 2025

(54) MACHINE-LEARNING-BASED QUALITY PREDICTION OF MANUFACTURED FIBER OPTIC CABLE

(71) Applicant: MAILLEFER EXTRUSION OY, Vantaa (FI)

(72) Inventors: Samppa Orhanen, Vantaa (FI); Mikko Lahti, Vantaa (FI); Jussi Hanhirova, Vantaa (FI); Janne Harjuhahto, Vantaa (FI)

(73) Assignee: Maillefer Extrusion Oy, Vantaa (FI)

( * ) Notice: Subject to any disclaimer, the term of this patent is extended or adjusted under 35 U.S.C. 154(b) by 475 days.

(21) Appl. No.: 17/642,424

(22) PCT Filed: Sep. 8, 2020

(86) PCT No.: PCT/FI2020/050574
§ 371 (c)(1),
(2) Date: Mar. 11, 2022

(87) PCT Pub. No.: WO2021/053265
PCT Pub. Date: Mar. 25, 2021

(65) Prior Publication Data
US 2022/0342379 A1 Oct. 27, 2022

(30) Foreign Application Priority Data

Sep. 20, 2019 (FI) .................................... 20195790

(51) Int. Cl.
*G05B 19/05* (2006.01)
*G06N 3/044* (2023.01)
(Continued)

(52) U.S. Cl.
CPC ........... *G05B 19/058* (2013.01); *G06N 3/044* (2023.01); *G06N 3/045* (2023.01); *G06N 20/00* (2019.01)

(58) Field of Classification Search
CPC .............. G05B 19/058; G05B 13/0265; G05B 19/41875; G06N 3/044; G06N 3/045;
(Continued)

(56) References Cited

U.S. PATENT DOCUMENTS 6,066,275 A 5/2000 Robinson et al.
8,489,219 B1 7/2013 Strong et al.
(Continued)

FOREIGN PATENT DOCUMENTS

EP 3168800 A1 5/2017
TW 201518871 A 5/2015
(Continued)

OTHER PUBLICATIONS

Bulsari et al., "Nonlinear Models Guide Secondary Coating of OFCs", Wire & Cable Technology International, 2001, pp. 40-42, figures 1-5.
(Continued)

*Primary Examiner* — Mohammad Ali
*Assistant Examiner* — Dhruvkumar Patel
(74) *Attorney, Agent, or Firm* — MacMillan, Sobanski & Todd, LLC

(57) ABSTRACT

According to an aspect, there is provided a method for monitoring quality of loose tube fiber optic cable during manufacture in a secondary coating line. Initially, a trained machine-learning algorithm for calculating expected values of one or more quality metrics of manufactured loose tube fiber optic cable based on values of the one or more production process parameters of the secondary coating line is maintained in a machine-learning database. A computing system monitors one or more values of the one or more production process parameters during miming of the secondary coating line and calculates, in real-time during the monitoring, one or more expected values of the one or more
(Continued)

quality metrics using the trained machine-learning algorithm with the monitored values of the one or more production process parameters as input. The computing system outputs at least the one or more expected values of the one or more quality metrics to a user device.

19 Claims, 7 Drawing Sheets

(51) Int. Cl.
 *G06N 3/045* (2023.01)
 *G06N 20/00* (2019.01)
(58) Field of Classification Search
 CPC .......... G06N 20/00; G06N 3/084; G06N 3/08; Y02P 90/02; G02B 6/4486; G02B 6/4479; G02B 6/4483; G02B 6/04; G02B 6/4484; B29C 48/05; B29C 48/156; B29C 48/34; B29D 11/00673
 See application file for complete search history.

(56) References Cited

U.S. PATENT DOCUMENTS

| | | | | |
|---|---|---|---|---|
| 2004/0052457 | A1* | 3/2004 | Lefebvre | B65H 57/20 385/37 |
| 2008/0020627 | A1* | 1/2008 | Sexton | H02H 3/38 439/404 |
| 2013/0178953 | A1* | 7/2013 | Wersborg | B23K 26/34 700/48 |
| 2015/0040681 | A1* | 2/2015 | Sarchi | G01M 5/0025 73/847 |
| 2017/0032281 | A1* | 2/2017 | Hsu | G05B 19/41875 |
| 2019/0102692 | A1 | 4/2019 | Kwant et al. | |
| 2021/0373063 | A1* | 12/2021 | Gundel | H02H 7/22 |

FOREIGN PATENT DOCUMENTS

| | | |
|---|---|---|
| TW | 201530333 A | 8/2015 |
| TW | 201734632 A | 10/2017 |
| TW | 201818169 A | 5/2018 |
| TW | 201839643 A | 11/2018 |
| TW | 201925910 A | 7/2019 |
| TW | 201931021 A | 8/2019 |
| WO | 2018182903 A1 | 10/2018 |

OTHER PUBLICATIONS

Lahti et al., "Achieving ultra-high speeds of polypropylene buffering for stranded loose tubes using nonlinear modelling", Proceedings of the 63rd International Wire & Cable Symposium (IWCS) Conference 2014, pp. 328-333, chapters 1-5, 7, figures 1-11.
Bulsari, "Nonlinear modelling for optical fibre cables", Wire Industry, 2003, pp. 203-206, figures 1,3,4.
Lahti et al., "Exploring the limits of buffering process for both standard and micro tubes", Proceedings of the 65th International Wire & Cable Symposium (IWCS) Conference 2016, pp. 668-672; abstract; chapters 1-6.
Smart Buffering—Remarkable Material Savings [online]. Blog—Maillefer. Published: Jan. 7, 2019 [retrieved Apr. 8, 2019]. From the Internet address: https://blog.maillefer.net/blog/smart-buffering-remarkable-material-savings; entire document.
Hanhirova et al., "A machine learning based quality control system for power cable manufacturing",Proceedings of the IEEE 17th International Conference on Industrial Informatics (INDIN), 2019, pp. 193-198.
Boost Your Line Supervision with the New Maillefer PSU6.1 (online]. Blog—Maillefer. Published: May 23, 2019 (retrieved Apr. 20, 2019]. From the Internet address: https://blog.maillefer.net/blog/boost-yourline-supervision-mekp50takeupsmaillefer-psu6.1, entire document.
Finish Patent and Registration Office, Search Report, Application No. 20195790, dated Apr. 22, 2020.
PCT International Search Report, Application No. PCT/FI2020/050574, dated Dec. 7, 2020.
Taiwanese Search Report, Application No. 109130056, dated Sep. 20, 2019.

* cited by examiner

MACHINE-LEARNING-BASED QUALITY PREDICTION OF MANUFACTURED FIBER OPTIC CABLE

FIELD OF THE INVENTION

The present invention relates to manufacturing of fiber optic cable and particularly to providing means for evaluating quality of fiber optic cable during manufacture.

BACKGROUND

A loose tube fiber optic cable is a type of fiber optic cable where glass fibers for carrying the optical signals are loosely encapsulated by a semi-rigid protective sleeve or tube (a so-called loose tube). The quality of loose tube fiber optic cable manufactured in a so-called secondary coating line is commonly monitored by periodically performing offline measurements of different key properties of the recently manufactured fiber optic cable. For example, said key properties to be measured may comprise excess fiber length, tube shrinkage and fiber light attenuation. Obviously, such offline measurements of already manufactured optical fiber cable require additional resources and they can be quite time-consuming. Moreover, any drop in the quality of the manufactured loose tube fiber optic cable may be detected only after a considerable delay. At least some of said key properties may be measured also during the manufacturing though such online measurements are often inaccurate compared to the offline measurements. Thus, there is a need for a solution which would enable monitoring the quality of fiber optic cables in a more automated manner during production without sacrificing accuracy.

BRIEF DESCRIPTION OF THE INVENTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

Figure 1:
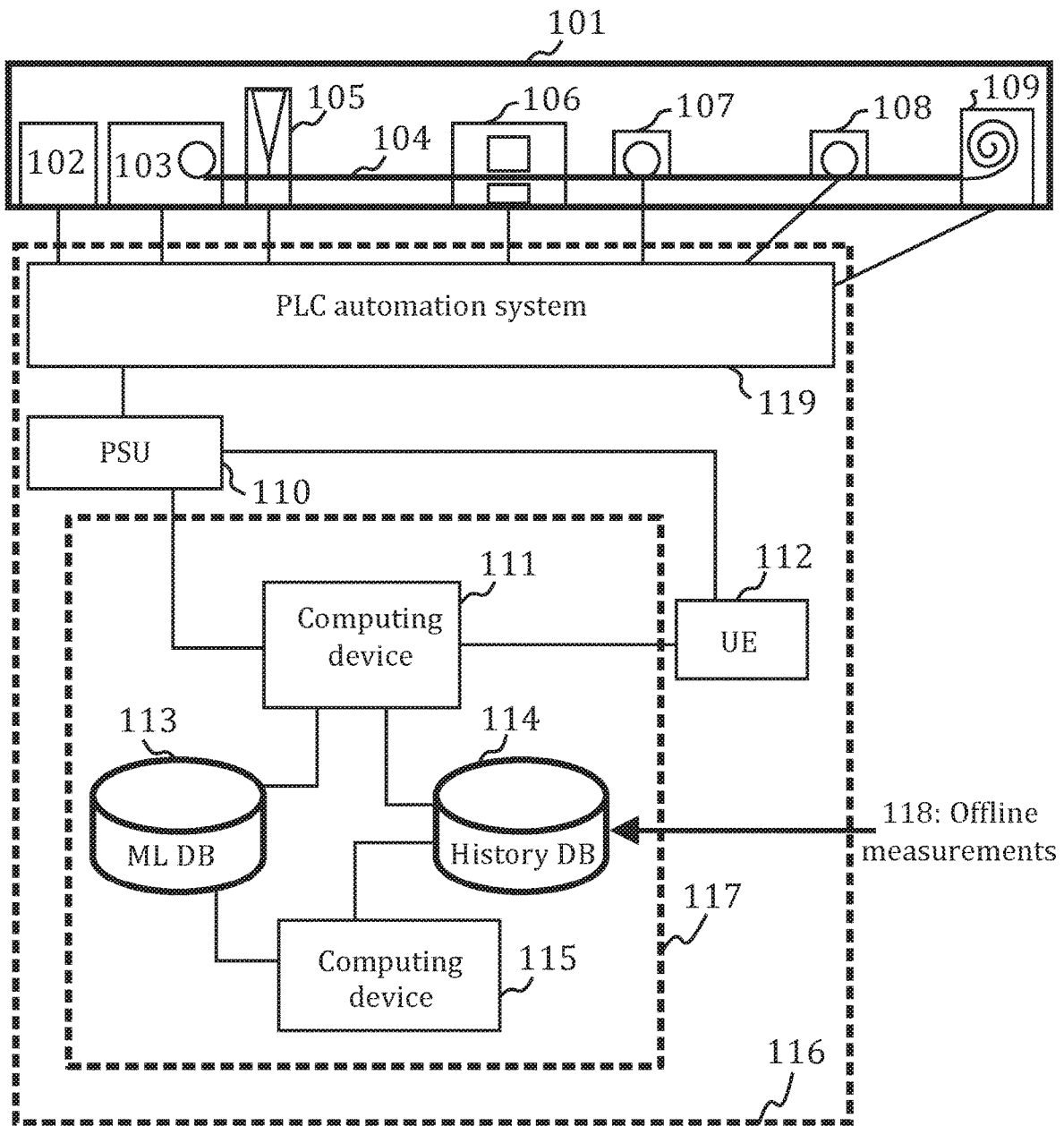
FIG. 1 illustrates a system according to embodiments.

A loose tube fiber optic cable is a type of fiber optic cable especially suited for harsh outdoor environments. In loose tube fiber optic cables, glass fibers for carrying the optical signals are loosely encapsulated by a semi-rigid protective sleeve or tube (a so-called loose tube or loose buffer tube). The space inside said loose tube not filled by the glass fibers is typically filled with a tube filling compound such as a water-resistant gel or jelly or a water-resistant yarn.

In many ways, the most critical phase in the manufacturing of loose tube fiber optic cables is the secondary coating phase performed in a secondary coating line. In the secondary coating phase, the glass fibers (and possibly a tube filling compound) are inserted into the loose tube (made typically of plastic). Initially, when the loose tube is extruded in the secondary coating phase, it has a very high temperature. As the loose tube cools down, it contracts or shrinks causing an offset in the lengths of glass fibers within the loose tube and the loose tube itself (that is, an increase in so-called excess fiber length). To overcome this effect, a so-called compression caterpillar is employed to influence the line speed of the loose tube (relative to the line speed of the fibers) so as to compensate for the shrinking of the loose tube. With the help of the compression caterpillar, very high line speeds may be achieved (e.g., up to 1000 meters per minute) while maintaining near-zero excess fiber length.

The quality of the fiber optic cable being manufactured in a secondary coating line is commonly monitored by periodically performing measurements of different key properties of the recently manufactured fiber optic cable. For example, said key properties to be measured may comprise excess fiber length, tube shrinkage and fiber light attenuation. Obviously, such offline measurements of already manufactured optical fiber cable require additional resources and can be quite time-consuming. For these reasons, said measurements may be carried out only sporadically and thus any drop in the quality of the manufactured fiber optic cable may be detected only after a considerable delay.

The embodiments to be discussed below seek to solve or at least alleviate at least some of said problems associated with monitoring quality of manufactured loose tube fiber optic cable.

In the following, different exemplifying embodiments will be described in detail. Said exemplifying embodiments are based on employing a machine-learning algorithm for predicting quality of fiber optic cable during manufacturing in a secondary coating line. To facilitate the detailed discussion on embodiments, the machine-learning algorithms which may be employed in connection with embodiments are discussed, first, in detail.

The machine-learning algorithm according to embodiments may be based on one or more neural networks. Neural networks (or specifically artificial neural networks) are computing systems comprised of highly interconnected "neurons" capable of information processing due to their dynamic state response to external inputs. In other words, an artificial neural network is an interconnected group of nodes (or "neurons"), where each connection between nodes is associated with a weight (i.e., a weighting factor), the value of which affects the strength of the signal at said connection and thus also the total output of the neural network. Usually, a bias term is also added to the total weighted sum of inputs at a node. Training of a neural network typically involves adjusting said weights and biases so as to match a known output given a certain known input.

The one or more neural networks employed in embodiments may comprise one or more feed-forward neural networks, one or more recurrent neural networks and/or one or more self-organizing maps (SOM). Moreover, the one or more feed forward neural networks may comprise one or more multi-level perceptron networks and/or one or more convolutional neural networks. The one or more recurrent neural networks may comprise one or more long-short term memories and/or one or more recurrent convolutional neural networks.

An example of a feedforward neural network which may be employed in embodiments is a multilayer perceptron model (though a network of simple perceptron may also be employed in some embodiments). A single layer perceptron can be used to learn linearly separable functions but cannot be used to perform complex tasks like learning a non-linear decision boundary in classification. On the other hand, a multilayer perceptron network, which uses two or more layers of perceptrons, may be used to learn complex functions and highly non-linear decision boundaries. A multilayer perceptron network is a basic form a feedforward neural network and typically consists of an input layer, one or more hidden layers and an output layer. The network uses forward passes and backpropagation to learn the weights and bias. Forward passes (from input to output) calculate the outputs, while backpropagation calculates the necessary updates for the weights and biases based on the error at the output layer.

Feedforward neural networks do not have the capability to store any information since there are no loops in feedforward neural networks. Recurrent neural networks (RNNs), on the other hand, have loops in them allowing information to be maintained. One example of a recurrent neural network which may be employed in embodiments is a long short term memory (LSTM) which is a special type of recurrent neural network specialized in learning long-term dependencies. A single LSTM cell consists of three gates (input, output and forget gate) and a memory cell. Gates act as regulators of information and help LSTM cells to remove old information or add new information. The extent to which the existing memory is forgotten is controlled by the forget gate.

The self-organizing map is a type of neural network that is trained using unsupervised learning to produce a low-dimensional discretized representation of the input space of the training samples (a so-called map). In other words, self-organizing may be employed to create a low-dimensional representation or view of high-dimensional data.

Additionally or alternatively, the machine-learning algorithm according to embodiments may be based, fully or partly, on a Bayesian classifier, that is, a classifier based on Bayesian probability. The Bayesian classifier used may be, for example, a naïve Bayesian classifier.

A system to which embodiments may be applied is illustrated in FIG. 1. FIG. 1 illustrates a simplified system only showing some elements and functional entities. The connections shown in FIG. 1 are logical connections; the actual physical connections may be different. It is apparent to a person skilled in the art that the systems also comprise other functions and structures. FIG. 1 is to be considered predominantly schematic in nature.

The system of FIG. 1 comprises two distinct parts: a secondary coating line 101 for manufacturing loose tube fiber optic cable and a control system 116 for managing, monitoring and/or controlling said secondary coating line 101.

The secondary coating line 101 is used for extruding a loose tube, feeding optical fibers (being typically glass fibers) inside the loose tube in a controlled manner and cooling and spooling the resulting loose tube fiber optic cable 104. The secondary coating line 101 comprises at least one or more actuators 102, a fiber pay off 103, an extruder 105, a compression caterpillar 106, a middle capstan 107, an end capstan 108 and a spooling unit 109.

The fiber pay off 103 is used for maintaining optical fiber (i.e., glass fiber) and for feeding one or more optical fibers to the extruder 105 and further along the secondary coating line 101 in a controlled manner, preferably at high speeds. The tension of the optical fiber may be controlled, for example, with pneumatic dancers. The fiber pay off 103 may comprise a plurality of reel positions for reels of optical fiber.

The extruder 105 (or an extruder unit) is used for extruding (plastic) material to form a loose tube structure around the one or more optical fibers originating from the fiber pay off 103. The extruded plastic material may be, for example, one of polybutylene terephthalate (PBT), polypropylene (PP), polyethylene (PE) and polycarbonate (PC) or some other plastic polymer. The produced loose tube may have cylindrical shape. The extruder may be temperature controlled. In some embodiments, multiple extruders may be employed. In some embodiments, the element 105 may correspond to one or more extruders or a plurality of extruders.

In embodiments where the loose tube fiber optic cable to be manufactured is to be filled with water-resistant (or water-blocking) yarn, the secondary coating line 101 may further comprise one or more yarn pay-offs for feeding yarn into the loose tube (not shown in FIG. 1). In embodiments where the loose tube fiber optic cable to be manufactured is to be filled with water-resistant (or water-blocking) gel or jelly, the secondary coating line 101 may further comprise a gel or jelly injection system for feeding gel or jelly into the loose tube (not shown in FIG. 1). Said gel or jelly injection system may be integrated into of one or more of the extruder 105. In some embodiments, the secondary coating line 101 may further comprise a dry (or gel-free) tube diameter control for controlling diameter of dry tube fiber optic cables.

Initially, when the loose tube is extruded by the extruder 105, it has a very high temperature. To efficiently cool down the loose tube, the loose tube fiber optic cable 104 may be passed through a cooling through or a cooling bath (not shown in FIG. 1). Said cooling through may extend from the extruder 105 all the way to the spooling unit 109. The cooling may be adjusted by changing the temperature of the cooling water used in the cooling through.

The compression caterpillar 106 is used for pulling the loose tube extruded by the extruder 105 at a speed which is faster than the line speed set point (i.e., faster than the speed of middle capstan 107 to be discussed below) in order to compensate for the shrinking of the loose tube as it cools down. In other words, the compression caterpillar 106 is used for minimizing the excess fiber length (EFL) and/or the tube shrinkage of the manufactured loose tube fiber optic cable. Excess fiber length is a measure for how much longer the one or more optical fibers inside the loose tube are compared to the loose tube encapsulating said one or more optical fibers. The compression caterpillar may comprise two moving compression belts extending parallel to each other and arranged facing each other.

The compression belts of the compression caterpillar 106 may be made of rubber or other material providing sufficiently high friction between the compression belts and the extruded loose tube. The loose tube may be fed between said compression belts which compress the loose tube and though friction and high speed of the compression belts (compared to the line speed without compression) cause an increase in the line speed of the loose tube (i.e., a lengthening of the loose tube) without affecting the line speed of the one or more optical fibers therein. The compression caused by the compression belts should be such that only elastic deformation (and not plastic deformation) is caused. In some embodiments, compression caterpillar may comprise, instead of compression belts, two compression wheels (e.g., made of rubber) operating in an analogous manner with the compression belts (as discussed above).

The middle capstan 107 is the next point of physical contact for the loose tube fiber optic cable 104 after the compression caterpillar 106. Consequently, the middle capstan 107 also has a significant effect on excess fiber length and tube shrinkage of the manufactured loose tube fiber optic cable and the parameters (e.g., motor torque) of the middle capstan 107 may be used for adjusting the excess fiber length and tube shrinkage.

In addition to the middle capstan 107, the secondary coating line may further comprise the end capstan 108 for providing further control of the line speed of the loose tube fiber optic cable. The end capstan 108 may be arranged between the middle capstan 108 and the spooling unit 109.

The spooling unit 109 is used for spooling the finished loose tube fiber optic cable 104.

Finally, the secondary coating line 101 comprises one or more actuators 102 for moving and controlling one or more devices 103, 105 to 109 of the secondary coating line 101. Said one or more actuators may power at least the compression caterpillar 106 and middle capstan 107. The one or more actuators 102 may comprise, for example, one or more of an electric motor, a hydraulic actuator and a pneumatic actuator. The one or more actuators 102 are powered and controlled by the control system 116 (or specifically by a programmable logic controller, PLC, automation system 119 of the control system 116). The operation of each of the one or more actuators 102 may be controlled by adjusting one or more control parameters of the corresponding actuator. The one or more control parameters for an actuator may comprise, for example, voltage, current, power and/or frequency of the signal fed to the actuator. In other words, the operation of the secondary coating line 101 may be adjusted by tuning one or more control parameters (in most cases, a plurality of control parameters) of the secondary coating line, where each control parameter is associated with one of the one or more actuators 102 of the secondary coating line 101. The control parameters may be equally called running parameters.

In addition to or alternative to controlling the secondary coating line 101 by adjusting the one or more control parameters of the one or more actuators 102, at least one of the other elements 103, 105, 104, 106, 107, 108, 109 of the secondary coating line 101 may be controlled according to one or more control parameters. For example, said one or more control parameters of said other elements in the secondary coating line may comprise one or more temperatures of one or more respective extruders 105, a temperature of cooling water (in the cooling through), a line tension and a fiber pay-off tension (i.e., tension at the fiber pay-off 103). The line tension may be defined as a metric (a value of which is given in newtons) quantifying how stretched the loose tube is during spooling. The fiber pay-off tension may be defined as a metric (value of which is given in newtons) quantifying how tense the fiber optic cable is at the beginning of the secondary coating line (i.e., near the fiber pay-off 103).

The control system 116 comprises a programmable logic controller (PLC) automation system 119, a process supervisory unit 110, a first computing device 111, a user device 112, a machine-learning database 113, a history database 114 and a second computing device 115. The first computing device 111, the machine-learning database 113, the history database 114 and the second computing device 115 form a computing system 117 for performing machine-learning-based analysis according to embodiments. Said control system 116 may be located in the same premises as the secondary coating line 101 (i.e., it may be a local system). Alternatively, at least some of the elements (e.g., the second computing device 115 and databases 113, 114) of the control system 116 may be remote elements (e.g., remote servers or databases). In some embodiments, some of said remote elements may be cloud computing-based elements or other distributed elements. The connections between apparatuses 110 to 115 of the control system 116 illustrated in FIG. 1 may comprise one or more wired connections (or communications links) and/or one or more wireless connections (communications links).

The PLC automation system 119 is used for monitoring and controlling manufacturing in the secondary coating line 101. Specifically, the PLC automation system 119 may be used for monitoring production process parameter(s) of the secondary coating line 101 and adjusting control parameter(s) of the secondary coating line. To enable said monitoring and controlling, the PLC automation system 119 may be connected, via wired and/or wireless communication links, to each individual element 102 to 109 of the secondary coating line 101 (including the cooling through not shown in FIG. 1) or at least some of said individual elements 102 to 109. Moreover, the PLC automation system 119 is connected to the process supervisory unit 110. The PLC automation system 119 may be a ruggedized computing system so as to enable reliable operation in a harsh usage environment.

In regards to the monitoring of the manufacturing in the secondary coating line 101, measurement data (i.e., production process data) produced by each individual element 102 to 109 of the secondary coating line 101 connected to the PLC automation system 119 during the running of the secondary coating line 101 may be transmitted, periodically or continuously, to the PLC automation system 119. The production process data collected by the PLC automation system 119 may comprise measured values for each of one or more production process parameters of the secondary coating line 101 (e.g., tension, speed and/or torque measurements associated with the compression caterpillar and/or the middle capstan).

In regards to the controlling of the manufacturing in the secondary coating line 101, the PLC automation system 119 may be configured to at least adjust the operation of the one or more actuators 102 of the secondary coating line 101. In other words, the PLC automation system 119 may provide control signalling (or control inputs) for the one or more actuators 102 to adjust their control parameters. The one or more production process parameters may be adjustable by adjusting said one or more control parameters of the secondary coating line 101. For example, increasing a frequency of an AC electric motor causes an increase in the torque of the AC electric motor and consequently also in the speed of the moving element which the AC electric motor is driving (e.g., a speed of the compression caterpillar).

The process supervisory unit (PSU) 110 of the control system 116 is used for handling recipe management and alarm systems as well as maintaining production process parameters received from the PLC automation system 119 in a database of the PSU 110 (not shown in FIG. 1). A recipe may be defined, in this context, as a set of instructions or steps needed to operate the secondary coating line to achieve a desired end product. The PSU 110 may further maintain in said database of the PSU 110 information on one or more recipes and/or nominal set values associated with the secondary coating line. The PSU 110 may be configured to run Supervisory Control and Data Acquisition (SCADA) software associated with the secondary coating line 101. Moreover, the PSU may be connected, via a wired or wireless communication link, to one or more monitors in a control room (not shown in FIG. 1). Said one or more monitors may be used for displaying (real-time) production process information to a human operator. The PSU 110 may be configured to forward or relay (current) production process data (i.e., monitored production process parameters) received from the PLC automation system 119 to the computing system 117 (specifically to the first computing device 111 in the illustrated embodiment) and/or to the user device 112. Furthermore, the PSU 110 may be configured to forward or relay control signalling (i.e., messages comprising one or more control parameters of the secondary coating line to be adjusted) from the computing system 117 (specifically from the first computing device 111 in the illustrated embodiment) and/or from the user device 112 to the PLC automation system 119.

The first computing device 111 of the computing system 117 is configured to monitor and possibly control quality of the manufactured loose tube fiber optic cable according to embodiments. Specifically, the first computing device 111 may evaluate current quality of the loose tube fiber optic cable using the current production process data and a (pre-)trained machine-learning algorithm maintained in the machine-learning database 113 which is connected to first computing device 111. The first computing device 111 may also be electrically connected to the history database 114, the PSU 110 and the user device 112. The first computing device may be configured to transmit information on predicted quality of the manufactured loose tube fiber optic cable and/or suggestions for possible adjustments of control parameters of the secondary coating line 101 for improving said predicted quality to the user device. The first computing device may also be configured to transmit control signals to the PSU 110 (which may be configured to forward said control signals to the PLC automation system 119). The first computing device 111 may maintain in a database (e.g., in an internal database or in the machine-learning or history database 113, 114) information on quality predictions it has performed and/or production line data received from the PSU 110. The first computing device may also maintain in a memory a buffer of control values and/or have have access to the database of the PSU 110. The PLC automation system 119 and/or the PSU 110 may be controlled remotely by the computing system 117 (specifically by the first computing device 111 in the illustrated embodiment) and/or the user device 112.

The user device 112 may refer to a portable or non-portable computing device (equipment, apparatus, terminal device). Computing devices which may be employed include wireless mobile communication devices operating with or without a subscriber identification module (SIM) in hardware or in software, including, but not limited to, the following types of devices: desktop computer, laptop, touch screen computer, mobile phone, smart phone, personal digital assistant (PDA), handset, e-reading device, tablet, game console, note-book, multimedia device, sensor, actuator, video camera, car, wearable computer, telemetry appliances, and telemonitoring appliances. The user device 112 may be connected to the computing system 117 via a first wireless or wired communications link and to the PSU 110 via a second wireless or wired communications link. The user device 112 is configured at least to receive information outputted by the first computing device 111 (or in general the computing system 117) and display said information on a screen (or a display) of the user device 112. As mentioned above, the user device 112 may also be used to control the PSU 110 and, via the PSU 110, the PLC automation system 119 (i.e., to adjust the control parameters of the secondary coating line 101). To enable a user of the user device 112 to issue control commands, the user device 112 may comprise at least one user input device (e.g., a touchscreen, one or more pushbuttons, a keyboard and/or a mouse). In practical scenarios, the user device 112 may be operated by a (production) supervisor of the secondary coating line 101 or some other person who is knowledgeable of the operation and control of the secondary coating line 101.

Finally, the second computing device 115 of the computing system 117 is configured at least to generate and train the machine learning algorithm employed by the first computing device 111. To achieve this functionality, the second computing device is connected to the history database 114 which maintains at least history data comprising quality data for fiber optic cable previously manufactured using the secondary coating line 101 or using another similar secondary coating line and corresponding production process data for the same secondary coating line acquired during manufacturing of said fiber optic cable. Said quality data may be based on offline measurements of quality metrics such as excess fiber length, tube shrinkage and fiber light attenuation. These offline quality measurements may have been performed, for example, at a quality control laboratory, that is, they are not performed using the elements illustrated in FIG. 1 (i.e., using the secondary coating line 101 or the control system 116). The element 118 is used for indicating that the offline measurements-based quality data maintained in the history database 114 is transferred to the history database 114 from outside of the control system 116 via an external interface of the computing system 117. If the quality data maintained in the history database 114 corresponds to fiber optic cable not manufactured by the secondary coating line 101 but by another corresponding secondary coating line (i.e., another secondary coating line of the same type and composition), the corresponding production process data also needs to be transferred to the history database 114 from the outside. The second computing device 115 may be configured to store the trained machine learning algorithm to the machine learning database 113 to which both the first and second computing devices 111, 115 have access.

In some embodiments, the history database 114 may also maintain control parameter data (i.e., control parameters), that is, control parameters according to which the secondary coating line 101 (or another corresponding secondary coating line) was previously controlled. Said control parameter data may correspond to the production process data maintained in the database (i.e., control parameters defined in said control parameter data may have been used for controlling a secondary coating line when values of the production process parameters were measured).

While FIG. 1 illustrates an exemplary computing system 117 according to embodiments comprising two separate computing devices 111, 115 and two databases 113, 114, in other embodiments the computing system 117 may comprise another number of distinct computing devices and/or databases. In some embodiments, the computing system 117 may, for example, comprise a single computing device (carrying out functions of both the first and second computing devices 111, 115) and two databases 113, 114 or a single database (maintaining information of both databases 113, 114) connected or comprised in said single computing device.

Figure 2:
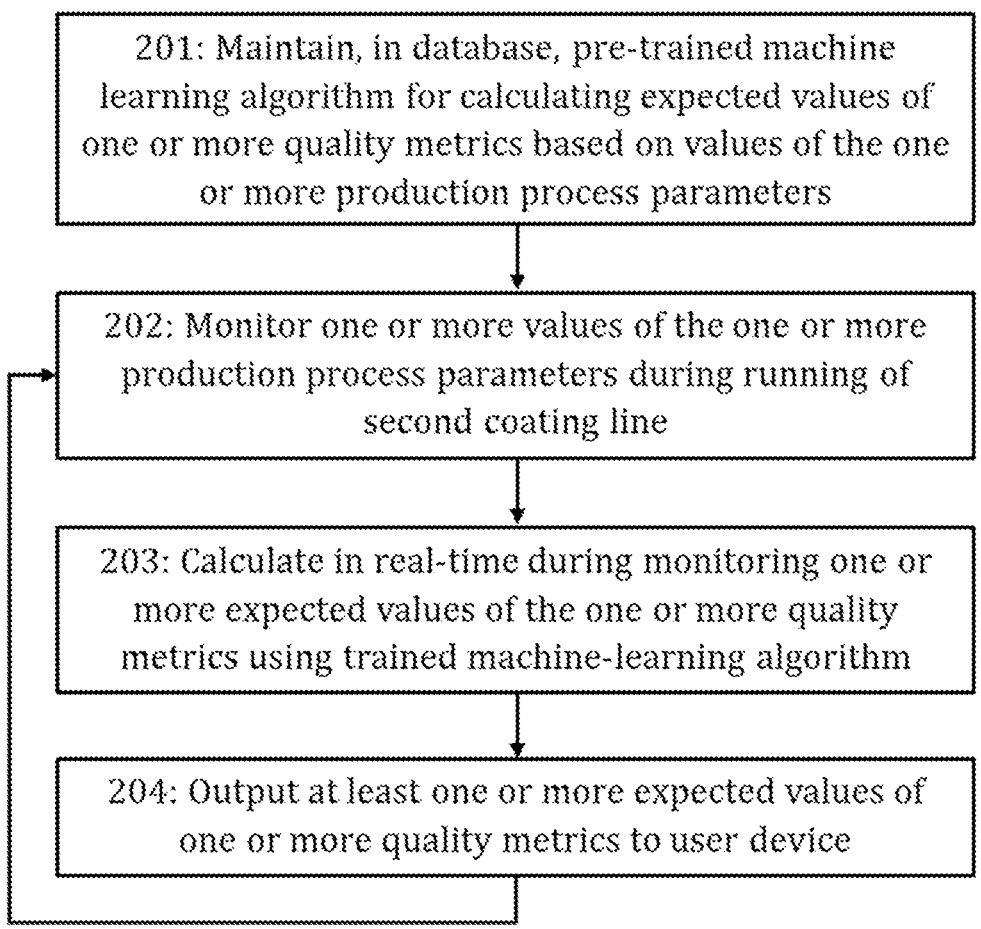
FIGS. 2 to 5, 6A and 6B illustrate processes according to embodiments.

FIG. 2 illustrates a process according to embodiments for predicting quality of fiber optic cable manufactured in a secondary coating line in real time. The fiber optic cable manufactured in the secondary coating line may specifically be loose tube fiber optic cable. The illustrated process may be carried out by a computing system 117 of FIG. 1 or by any alternative computing system discussed in relation to FIG. 1. The process illustrated in FIG. 1 may be specifically carried out by a first computing device 111 of FIG. 1 or by any corresponding computing device (i.e., a computing device having access at least to current process data and to pre-trained machine learning algorithm and connected to a user device) in any alternative computing system discussed in relation to FIG. 1. The computing system or device carrying out the process of FIG. 1 may be configured to monitor and possibly control (possibly via a PSU and a PLC automation system) a secondary coating line comprising at least some of the elements discussed in relation the secondary coating line 101 of FIG. 1. In some embodiments, said secondary coating line is assumed to comprise at least a compression caterpillar and a middle capstan. In the following, the entity performing the process is called a computing system merely for simplicity.

Initially, the computing system maintains, in a first database (e.g., in a machine-learning database as discussed in relation to FIG. 1) in block 201, a trained machine-learning algorithm for calculating expected values of one or more quality metrics of the fiber optic cable manufactured in the secondary coating line based on values of the one or more production process parameters of the secondary coating line. In other words, the trained machine-learning algorithm takes as its input values of one or more production process parameters and provides as its output expected values for one or more quality metrics.

The one or more quality metrics (i.e., inputs of the trained machine-learning algorithm) are metrics indicative of at least some aspect of quality of the manufactured fiber optic cable. At least some of the one or more quality metrics may correspond to quality metrics which are conventionally assessed using offline measurements of the manufactured fiber optic cable. Said one or more quality metrics may comprise, for example, one or more of excess fiber length, tube shrinkage and light attenuation in the fiber optic cable, loose tube dimensions, stability of loose tube dimensions, a metric associated with a crush test and a metric associated with a kink test.

In some embodiments, said one or more quality metrics comprise at least one (preferably all) selected from a group of excess fiber length, tube shrinkage and light attenuation in the fiber optic cable. Said three metrics may be considered the most critical metrics for the quality of loose tube fiber optic cable and are thus discussed here in more detail.

Excess fiber length (EFL) may be defined as the length of optical fiber in a loose tube divided by the length of the loose tube (sometimes given in percents). A large EFL means that the optical fibre is bent in a coil-like manner inside the loose tube. Excessive bending of the optical fiber may lead to degradation of the performance of the optical fiber cable. Excess fiber length is a metric conventionally measured offline for each fiber as standard quality control procedure. Excess fiber length may be evaluated also online during production by measuring the speed of the fibers at the payoff and speed of the loose tube before spooling though these measurements are typically not very accurate.

Tube shrinkage is a phenomenon caused by relaxation of the plastic loose tube after production. The amount of tube shrinkage depends on the production process conditions like line speed, cooling temperatures and compression caterpillar parameters. Tube shrinkage is conventionally measured offline for each manufactured loose tube as standard quality control procedure.

Having low light attenuation is the most important feature for any fiber optic cable. The attenuation of optical fibers increases if they are subjected to mechanical stress during production or when spooled on a reel. The light attenuation is conventionally measured offline as a standard quality control procedure. The light attenuation may be expressed as decibels per meter.

In some embodiments, the one or more quality metrics used as inputs of the trained machine-learning algorithm comprise (or consist solely of) an overall quality metric. The overall quality metric is a metric indicating overall or total quality of the manufactured fiber optic cable. The overall quality metric (or its value) may be equally called a quality class. The overall quality metric may be defined so that it has a value selected from a discrete set of numeric values (e.g., 0, 1 and 2). Each numeric value in said discrete set may correspond to a particular literal assessment of overall quality (e.g., 0 being "Bad", 1 being "Mediocre" and 2 being "Good") which may specifically be displayed to a user of the user device via the screen of the user device.

The overall quality metric (or class) may be defined to be a function of two or more quality metrics values of which may be determinable using (offline) measurements of the manufactured loose tube fiber optic cable (e.g., excess fiber length, tube shrinkage and/or light attenuation in the fiber optic cable). For example, the overall quality metric may be defined as a sum, a weighted sum, an average or a weighted average of said two or more quality metrics. The results of said calculation may further be rounded or cut-off (e.g., to an integer value) so as to match a value in the pre-defined discrete set (i.e., to match one of pre-defined quality classes).

In some embodiments, the computing system may first calculate one or more expected values of one or more quality metrics (such as excess fiber length, tube shrinkage and/or light attenuation in the fiber optic cable) using the trained machine-learning algorithm and then calculate an expected value of an overall quality metric based on said one or more expected values of the one or more quality metrics.

Said one or more production process parameters are parameters or properties of different processes of the secondary coating line. Said one or more production process parameters may be associated with one or more of a fiber pay-off, an extruder, a compression caterpillar, a middle capstan, an end capstan and a spooling unit or with any other apparatuses of the secondary coating line. The parameters of the compression caterpillar and the middle capstan often have an especially pronounced effect on the end quality of the loose tube fiber optic cable. Therefore, said one or more production process parameters may comprise one or more production process parameters associated with the compression caterpillar and/or the middle capstan. Said production process parameters may comprise one or more of speed of the compression caterpillar, tension of the compression caterpillar, torque of a motor of the compression caterpillar and torque of a motor of a middle capstan, a standard deviation of the speed of the compression caterpillar over a pre-defined amount of time, a standard deviation of the tension of the compression caterpillar over a pre-defined amount of time, a standard deviation of the torque of the motor of the compression caterpillar over a pre-defined amount of time and a standard deviation of the torque of the motor of the middle capstan over a pre-defined amount of time.

The generation and training of the trained machine learning algorithm may be carried out by the computing system (or specifically by a second computing device as discussed in relation to FIG. 1), for example, as is discussed below in relation to FIG. 3. In other embodiments, the trained machine learning algorithm may be generated and/or trained by an entity (e.g., a network node or a computing device) other than the computing system performing processes of FIG. 2. As discussed above, the machine learning algorithm according to embodiments may be based, for example, on one or more feed forward neural networks, a Bayesian classifier, a self-organizing map (SOM) or a combination thereof.

The computing system monitors, in block 202, one or more values of the one or more (respective) production process parameters of the secondary coating line during running of the secondary coating line. Monitoring is required as changes in the production process parameters of the secondary coating line may occur during the running of the secondary coating line due to various factors such as changes in the environment in which the secondary coating line is run (e.g., increased temperature) or wear and tear of the elements of the secondary coating line (e.g., in a compression belt of the compression caterpillar). The one or more production process parameters which are monitored may comprise at least the one or more production process parameters used as an input of the trained machine-learning algorithm. The monitoring may be carried out via a PSU and a PLC automation system as was discussed in relation to FIG. 1. In other words, production process data (comprising at least said one or more value of the one or more production process parameters) may be measured and collected, in real time during the running of the secondary coating line, by a PLC automation system and transmitted to a PSU which forwards said data to the computing system for analysis (in addition to storing said data to a database of the PSU). The values of the one or more production process parameters may be measured and provided for the computing system periodically (with one or more different periods associated with different parameters).

During the monitoring, the computing system calculates, in block 203, in real time one or more expected values of the one or more quality metrics using the trained machine-learning algorithm, where the monitored values of the one or more production process parameters are used as an input of the trained machine-learning algorithm.

The computing system outputs, in block 204, at least the one or more expected values of the one or more quality metrics to a user device. Additionally, the computing system may also output the monitored (i.e., current) values of the one or more production parameters corresponding the one or more expected values of the one or more quality metrics.

In some embodiments, the outputting in block 204 may comprise causing displaying at least one of the expected values of the one or more quality metrics on a screen of a user device in real-time for guiding a user of the user device in managing the secondary coating line. In some cases (e.g., in the case of overall quality metric), a visual or written indication of an expected value may be displayed (e.g., indicating that overall quality is "Good" or indicating value of a quality metric with a visual element such as bar diagram), instead of or in addition to the raw number value. Based on the displayed information, the user of the user device may determine whether at least one of the control parameters of the secondary coating line should be adjusted so as to induce a change in production process parameters of the secondary coating line which, in turn, would result in improved quality of the end product. Subsequently, the user device may transmit, upon corresponding user input, control commands to the secondary coating line for adjusting at least one of the control parameters of the secondary coating line.

The term "causing displaying" information on a screen of the user device may comprise, here and in the following embodiments, transmitting a command to the user device to display a corresponding information on said screen. In other embodiments, the user device may be configured to display any expected quality and/or production process information received from the computing system on the screen of the user device automatically (i.e., without explicit command to do so).

Actions pertaining to blocks 202 to 204 may be carried out by the computing system continuously as the secondary coating line is in operation, as indicated by the arrow connecting block 204 to block 202.

Figure 3:
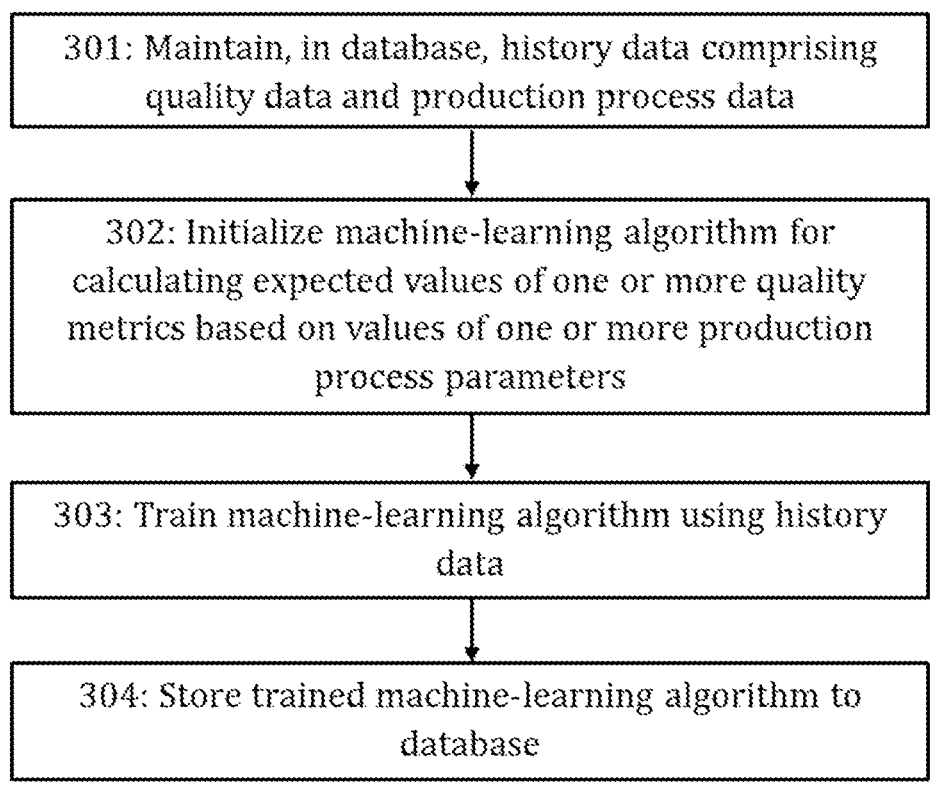

FIG. 3 illustrates a process for generating and training the machine learning algorithm described in relation to FIG. 2. The process may be carried out by the same computing system which subsequently carries out the predicting using the (pre-)trained machine learning algorithm according to embodiments. Considering the system of FIG. 1, the processes of FIG. 2 may be carried out by the first computing device 111 while the processes to be discussed in relation to FIG. 3 may be carried out by a second computing device 115. Alternatively, the generating and training of the machine-learning algorithm may be carried out by another entity not forming a part of the computing system.

Referring to FIG. 3, the computing system maintains, in a database (e.g., in the history database) in block 301, history data comprising quality data for fiber optic cable previously manufactured using the secondary coating line and production process data of the secondary coating line acquired during manufacturing of said fiber optic cable. The quality data comprises a plurality of measured values for each of one or more quality metrics and the production process data comprises a plurality of measured values for each of one or more production process parameters of the secondary coating line. The one or more quality metrics and the one or more production process parameters may be defined as described in relation to FIG. 2. The quality data may have been gathered through conventional offline quality measurements while the production process data may have been gathered through online measurements (i.e., monitoring similar to as described in relation to block 202 of FIG. 2) during the running of the secondary coating line.

The computing system initializes, in block 302, a machine-learning algorithm for calculating expected values of one or more quality metrics based on values of the one or more production process parameters. The machine learning algorithm may be any machine learning algorithm as discussed above, e.g., a neural network-based algorithm employing one or more feedforward neural networks and/or one or more recurrent neural networks. The initialization may comprise defining the inputs (i.e., features) and outputs (i.e., labels) of the machine-learning algorithm and setting or selecting initial values for weights and/or parameters of the machine learning algorithm (e.g., weights of one or more neural networks). Here, features (i.e., input) of the machine learning algorithm may be defined to correspond quality metrics of the manufactured fiber optic cable and labels (i.e., out-put) of the machine learning algorithm may be defined to correspond to production process parameters of the secondary coating line. The initial values may be random values or they may correspond to a pre-defined set of values known to result in a well-performing algorithm. Any known initialization technique may be employed in the initialization in block 302.

The computing system trains, in block 303, the machine-learning algorithm using the history data. In other words, the history data (or part thereof) is used as training data of the machine-learning algorithm. Specifically, the production process data is used as input of the machine learning algorithm while the quality data defines corresponding desired outputs of the machine learning algorithm. The training may comprise feeding the production process data (i.e., values of one or more production process parameters) to the machine-learning algorithm, comparing the expected values of one or more quality metrics outputted by the machine-learning algorithm to the measured values of said one or more quality metrics in the history data and adjusting one or more weights and/or parameters of the machine-learning algorithm so as to minimize the difference between the expected and measured values. The comparing may be performed by evaluating a cost function which is a measure of how incorrect the machine-learning algorithm is in terms of its ability to estimate the relationship between its inputs and outputs. The cost function may be expressed as a difference or distance between the predicted value and the actual value (or predicted value vector and the actual value vector in the case of multiple output variables).

Finally, the computing system stores, in block 304, the trained machine learning algorithm to the machine-learning database (or some other database). Subsequently, the computing system (or specifically the first computing device of the computing system) may employ said stored trained machine learning algorithm for performing the prediction according to embodiments (e.g., as described in relation to FIG. 1).

In some embodiments, the actions pertaining to blocks 301 to 304 may be carried out offline (i.e., when the secondary coating line disabled or non-operational). In other embodiments, the actions pertaining to blocks 301 to 304 may be carried out online during normal operation of the secondary coating line.

Figure 4:
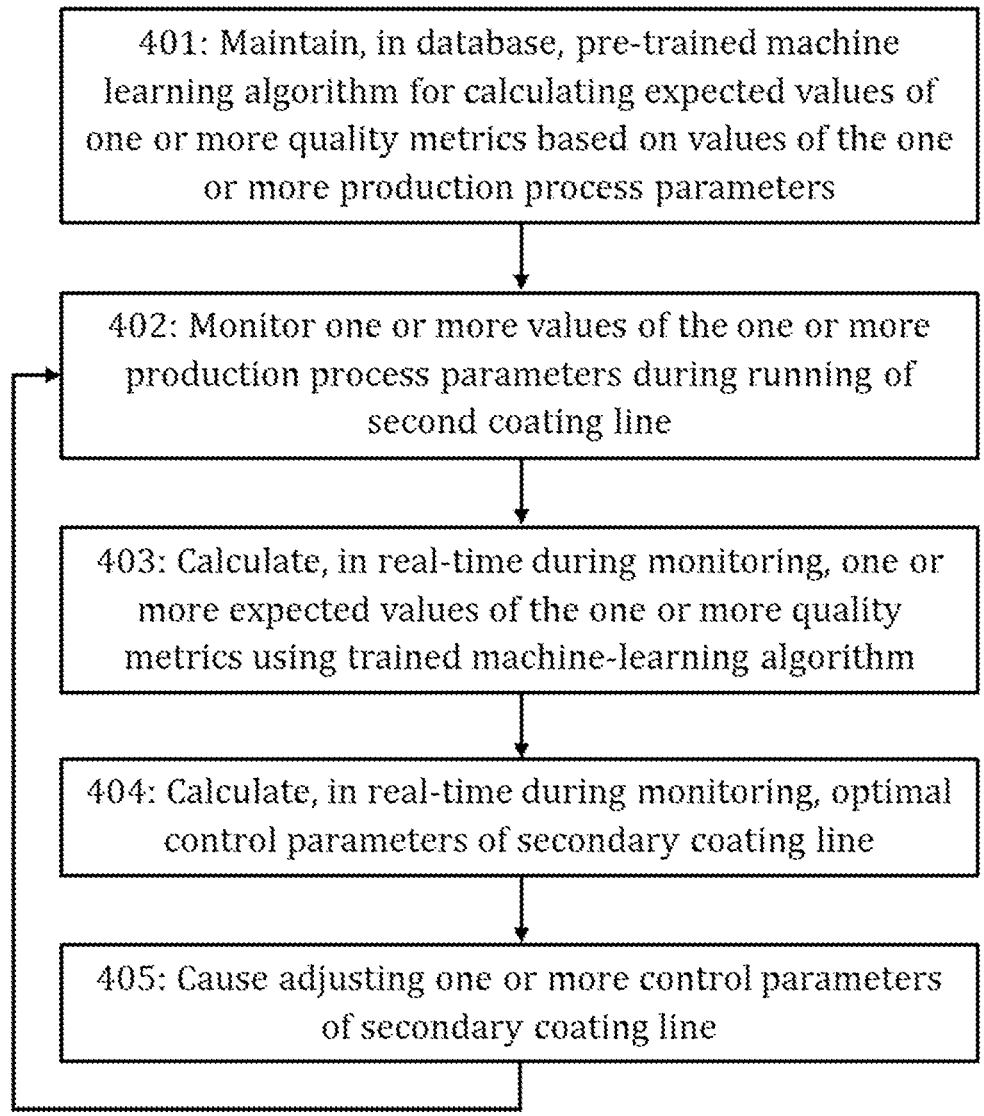

FIG. 4 illustrates an alternative process according to embodiments for predicting quality of (loose tube) fiber optic cable manufactured in a secondary coating line in real time. The illustrated process may be performed by any entity described in relation to FIG. 2 as performing the process of FIG. 2 (e.g., by a computing system or a particular computing device therein). In general, the process of FIG. 4 corresponds to a large extent to the process of FIG. 2. Any definitions given in relation to FIG. 2 apply or may be combined with the process of FIG. 4 (unless otherwise stated).

Referring to FIG. 4, the initial blocks 401 to 403 may correspond fully to blocks 201 to 203 of FIG. 2. Thus, the actions pertaining to said blocks are not discussed here for brevity. Instead, the discussion is concentrated on the additional/alternative feature introduced in FIG. 4 as blocks 404, 405.

After the computing system has calculated one or more expected values of the one or more quality metrics using the trained machine-learning algorithm in block 403, the computing system further calculates, in block 404, in real-time during the monitoring, one or more optimal values of one or more control parameters of the secondary coating line for improving quality of the fiber optic cable being manufactured. The quality of the fiber optic cable may mean, here specifically quality as defined by the one or more expected values of the one or more quality metrics (e.g., an expected value for an overall quality metric or one or more expected values of one or more quality metrics conventionally evaluated through offline measurements). The one or more control parameters for which said one or more optimal values are calculated may comprise some or all of the control parameters which may be used (by the PLC automation system) for controlling the secondary coating line.

The calculating of the one or more optimal values for the one or more control parameters in block 404 may comprise, first, comparing the one or more monitored values of the one or more production process parameters to one or more corresponding optimal values of the one or more production process parameters to determine which production process parameters deviate from the optimal values and thus require adjustment. Said optimal values of the one or more production process parameters may be determined based on history data (i.e., quality and production process data) maintained in the history database or based on the trained machine-learning algorithm and/or they may be maintained in the history or machine-learning database. Regarding the first option, said history data may comprise data based on offline measurements and/or data based on previous quality predictions by the computing system. In some embodiments, the optimal values of the one or more production process parameters may correspond simply to values which have previously resulted in fiber optic cable having high(est) quality. Pre-defined mappings between production process parameters and control parameters may be maintained in a database (e.g., in the history database, the machine-learning database or the database of the PSU). Based on said pre-defined mappings and the optimal values of the one or more production process parameters in need of adjustment, the one or more optimal values of the one or more control parameters may be calculated (in block 404).

Alternatively, the calculation in block 404 may be carried out using a pre-defined algorithm taking as input at least the one or more monitored values of the production process parameters (and possibly the one or more expected values of the one or more quality metrics and/or monitored control parameters). In other words, the pre-defined algorithm used in block 404 may correspond to a process model that captures the internal mechanisms of the manufacturing process of the secondary coating line and models the relationships (or connections or interactions) between different parameters (that is, at least between different control parameters and production process parameter). The pre-defined algorithm may be maintained, e.g., in the machine-learning database or in another memory or database connected or comprised in the computing system. The pre-defined algorithm may have been generated or built using knowledge of the manufacturing process and by analyzing data produced by said manufacturing process (e.g., production process parameters and/or control parameters). Said pre-defined algorithm may have been generated, for example, based on one or more of history data maintained in the history database, monitored production process parameters, monitored control parameters and/or said pre-defined mappings (if they exist). In some embodiments, the generation of the pre-defined algorithm may, also or alternatively, employ the trained machine-learning algorithm. Said pre-defined algorithm may employ the trained machine-learning algorithm in the calculation of block 404. In other embodiments, said pre-defined algorithm may correspond to or comprise the trained machine-learning algorithm. In other words, a single pre-defined algorithm may be provided connecting the control parameters not only to the production process parameters but also to quality metrics, in some embodiments. In these embodiments, the pre-defined algorithm used in block 404 may be the same as the machine-learning algorithm described above.

The computing system causes, in block 405, adjusting, in real-time during the monitoring, the one or more control parameters of the secondary coating line to match the one or more optimal values of the one or more control parameters (or at least to reduce the difference between the one or more optimal values and the one or more current values of the one or more control parameters). The causing adjusting may comprise transmitting control data for adjusting the one or more control parameters to a PSU which consequently forwards said control data to a PLC automations system which adjusts the operation of the one or more actuators driving the secondary coating line (and possibly operation of other elements of the secondary coating line) accordingly. In this particular embodiment, the adjusting of the control parameters may be fully automated and thus no separate user device is necessarily required for managing the secondary coating line.

The embodiments illustrated in FIGS. 2 and 4 may also be combined so that the computing system outputs, between blocks 404, 405 or directly following block 405, at least the one or more expected values of the one or more quality metrics to a user device, as described in relation to block 204 of FIG. 2. Any additional features described in relation block 204 of FIG. 2 may also be applied in this case.

In some embodiments, the actions pertaining to blocks 404, 405 may be carried out only if it is determined, by the computing system, that at least one of the one or more expected values of the one or more quality metrics (calculated in block 403) falls below at least one corresponding pre-defined threshold defined for corresponding at least one quality metric, that is, if the quality of the manufactured fiber optic cable is detected to be sufficiently low.

Figure 5:
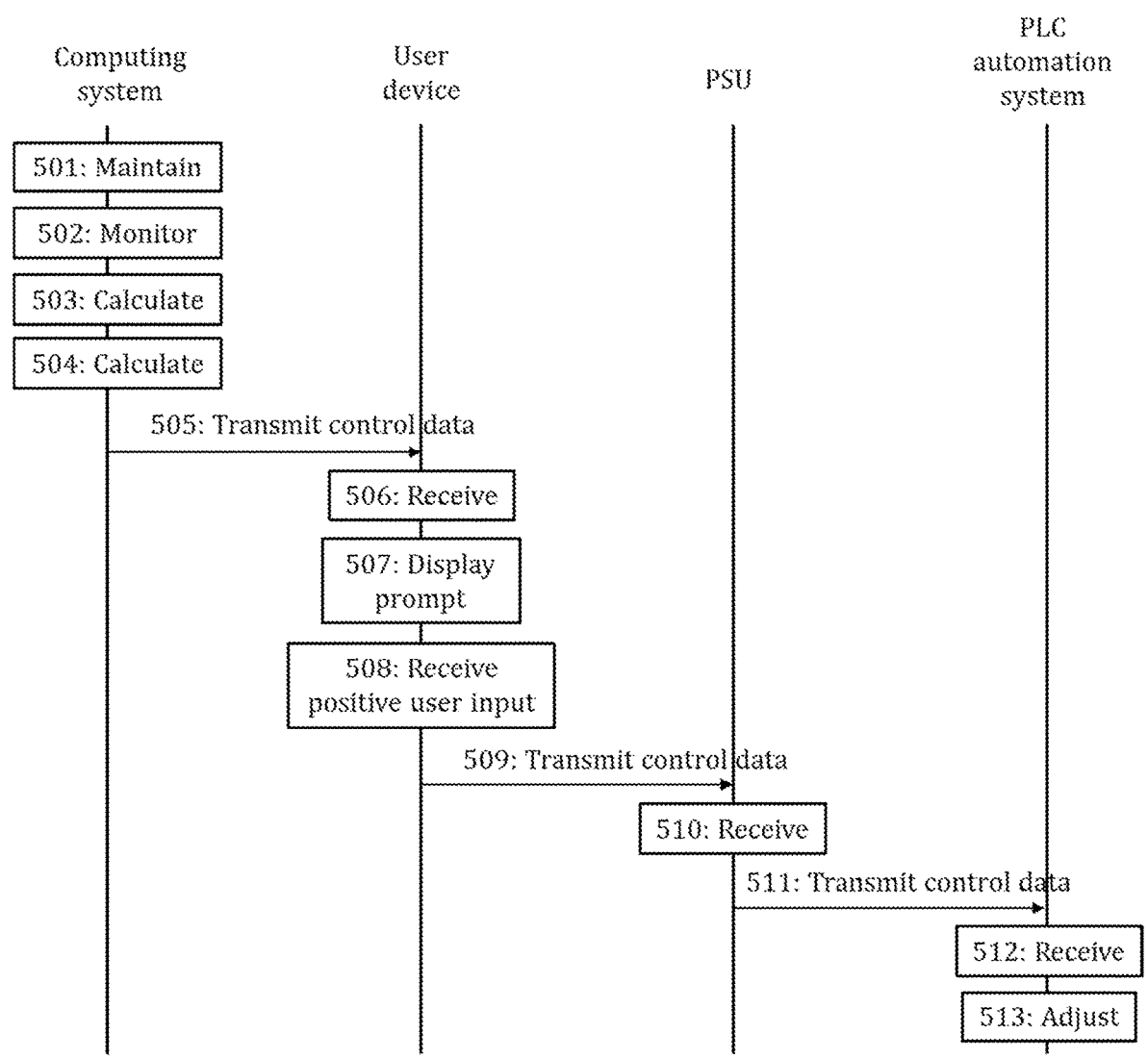

In the embodiment illustrated in FIG. 4, the adjusting of the control parameters is fully automatic requiring no feedback from a user. In some cases, it may, however, be beneficial, for example, to improve safety and ensure high quality of production, to allow the user to make the final decision on any changes to the control parameters of the secondary coating line. FIG. 5 illustrates a signaling diagram according to embodiments for enabling said user-driven decision-making functionality. Specifically, FIG. 5 illustrates signaling between a computing system, a user device, a PSU and a PLC automation system which correspond to corresponding elements illustrated in FIG. 1. The computing system of FIG. 5 may correspond to any entity described in relation to FIG. 2 as performing the process of FIG. 2 (e.g., a computing system or a particular computing device therein). In general, the process of FIG. 5 corresponds to a large extent to the processes of FIG. 2 and/or FIG. 4. Any definitions given in relation to FIGS. 2 and/or 4 apply or may be combined with the process of FIG. 5 (unless otherwise stated).

Referring to FIG. 5, the initial blocks 501 to 504 may correspond fully to blocks 401 to 404 of FIG. 4. Thus, the actions pertaining to said blocks are not discussed here for brevity. Instead, the discussion is concentrated on the additional/alternative feature introduced in FIG. 5 as elements 505 to 513.

In FIG. 5, after the computing system has calculated, in block 504, one or more optimal values for the one or more control parameters so as to improve quality of the fiber optic cable being manufactured, the computing system causes displaying a prompt for changing one or more current values of the one or more control parameters to match the one or more optimal values for the one or more control parameters on a screen of a user device. Specifically, the causing displaying may comprise transmitting, in message 505, to the user device control data for displaying said prompt. Upon receiving the control data in block 506, the user device displays, in block 507, said prompt. The prompt may be defined here as a question or statement that appears on the screen and which may indicate selectable options to the user (here, at least options for changing the control parameters and not changing the control parameters). This way any adjustments of the control parameters have to be approved by a human operator.

Upon receiving, in block 508, a positive user input approving the adjustment(s) to the one or more control parameters suggested by the prompt via a user input device of the user device, the user device transmits, in message 509, to the PSU control data for adjusting the one or more control parameters. Consequently, upon receiving the control data in block 510, the PSU transmits (or forwards), in message 511, said control data for adjusting the one or more control parameters to the PLC automation system. In some embodiments, the PSU may also store the control data to a database of the PSU.

In response to receiving the control data in block 512, the PLC automation system adjusts, in block 513, the one or more control parameters according to the control data.

In some alternative embodiments, the computing system may cause displaying, instead of the prompt, merely the one or more optimal values for the one or more control parameters on the screen of the user device and optionally also the current values for the one or more control parameters. In such embodiments, the user may not be provided an option for quickly changing the one or more control parameters to match the optimal values, but the user may, instead, have to manually set the control parameters with the user device (using a dedicated application for managing the secondary coating line).

In some embodiments, the computing system may maintain, in a database (e.g., in the history database, in the machine-learning database or in the database of the PSU), one or more pre-defined lists of actions (i.e., actions relating to tuning of the control parameters) which may be performed if a deviation in a certain production process parameter is detected. Based on said one or more pre-defined lists of actions, the computing system may cause displaying information on one or more options for adjusting one or more control parameters for improving the quality of the fiber optic cable on the screen of the user device. For example, if it is detected that a value of a standard deviation of motor torque is much higher than the optimal value, the computing system may cause displaying on the screen of the user device information on one or more options for what the operator can do to reduce the instability of the process indicated by the high standard deviation.

Figure 6A:
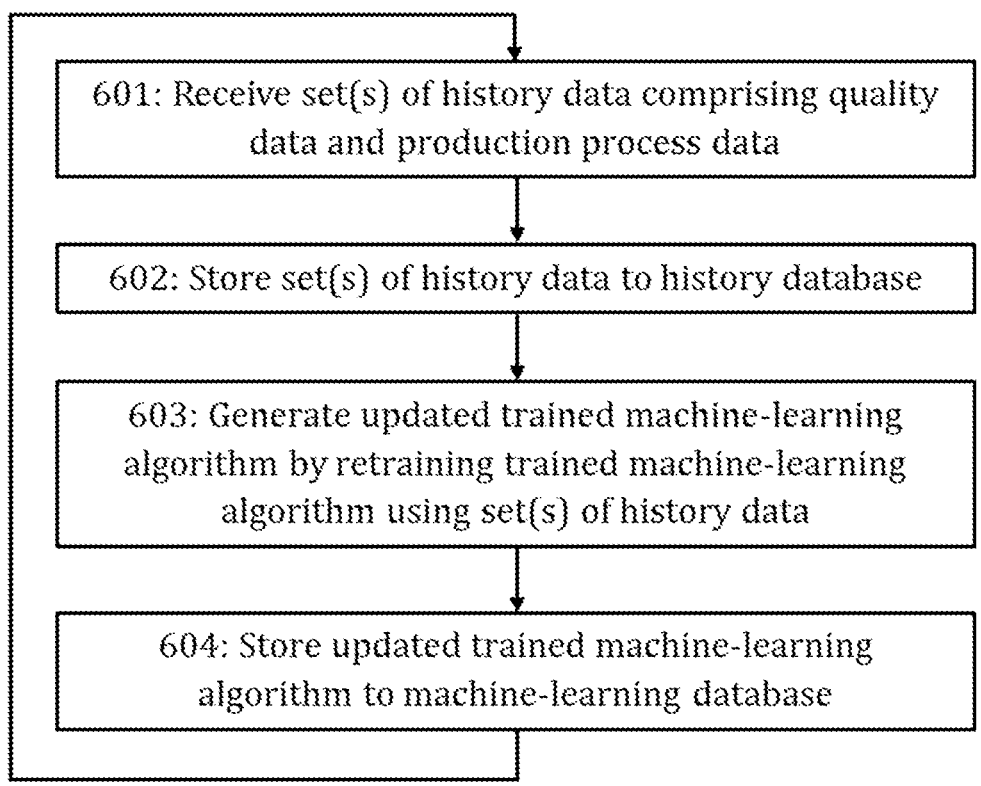
Figure 6B:
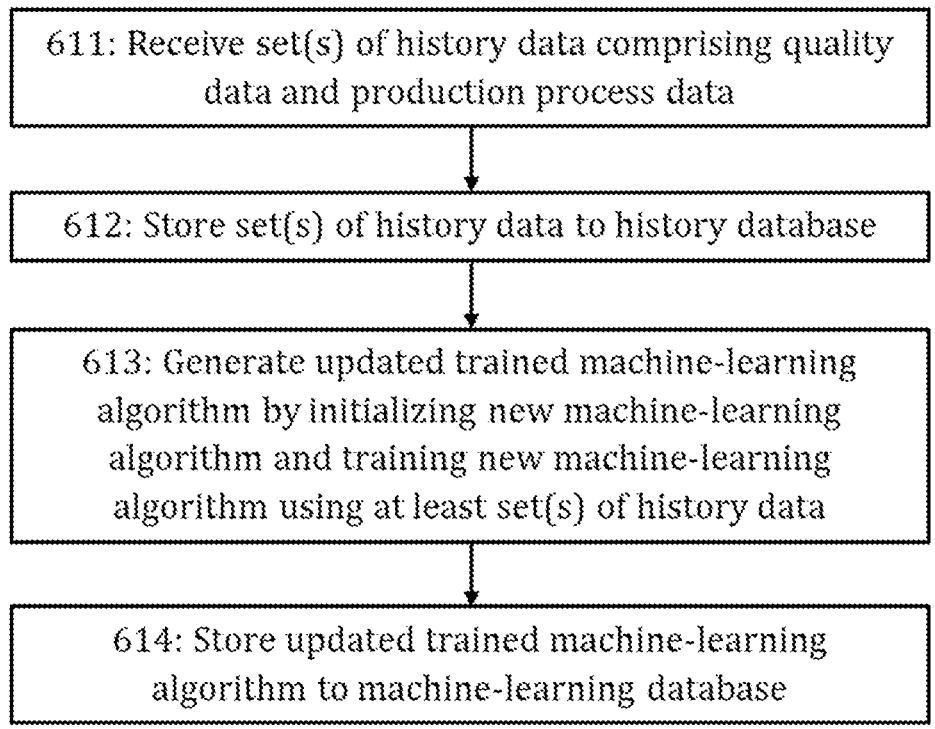

After the machine-learning algorithm has been trained (e.g., as discussed in relation to FIG. 3) and the trained machine-learning algorithm has been in use for a certain amount of time for evaluating quality of the manufactured fiber optic cable, it may be beneficial to retrain the machine-learning algorithm using the most up-to-date quality data. FIGS. 6A and 6B illustrate two different processes for carrying out the retraining according to embodiments. The illustrated processes (or only one of them) may be performed by any entity described in relation to FIG. 2 as performing the process of FIG. 2, e.g., by a computing system for predicting quality of fiber optic cable manufactured in a secondary coating line or a particular computing device therein. The computing system or the particular computing device therein may be configured to perform one or both of the processes illustrated in FIGS. 6A and 6B. For example, the process of FIG. 6A may be performed periodically with a first period and the process of FIG. 6B may be performed periodically using a second period (preferably much larger than the first period) or only upon receiving a request, e.g., from a user device.

Referring to FIG. 6A, the computing system receives, in block 601, one or more sets of history data via an external interface of the computing system. Each set of history data may be similar to the history data described in relation to above embodiments. In other words, each set of history data comprises quality data for loose tube fiber optic cable previously manufactured using one of the secondary coating line (i.e., the secondary coating line manufacturing fiber optic cable whose quality is to be predicted by the computing system) and another corresponding secondary coating line (e.g., a dedicated reference secondary coating line) and production process data of the same secondary coating line acquired during manufacturing of said loose tube fiber optic cable. Here (similar to above embodiments), the quality data comprises a plurality of measured values for each of one or more quality metrics and the production process data comprises a plurality of measured values for each of one or more production process parameters of the secondary coating line (or equally of said another corresponding secondary coating line). If said one or more sets of history data consists of a plurality of sets of history data, said plurality of sets of history data may be received, in block 601, as a single transmission or transfer or as a plurality of transmissions or transfers received periodically or sporadically. Regarding the latter option, any new history data may be transferred to the computing system as soon as it becomes available, but the reception of a single set does not necessarily trigger any retraining process. Instead, the retraining process of FIG. 6A may be triggered based on a timer (e.g., after a pre-defined time or period has passed after the initial training or the last update) and/or based on the amount of (new) history data collected by the computing system.

Upon receiving each of the one or more sets of history data in block 601, the computing system stores, in block 602, the received set to the history database of the computing system. Block 602 may be omitted in some embodiments.

The computing system generates, in block 603, an updated trained machine-learning algorithm by retraining the trained machine-learning algorithm (maintained in the machine-learning database) using said one or more sets of history data. In other words, the current trained machine-learning algorithm is used as a starting point for the retraining in this embodiment. This way the current trained machine-learning algorithm may be further fine-tuned to improve accuracy of the predictions. The retraining in block 603 may comprise, for example, if the machine-learning algorithm is based on one or more neural networks, adjusting one or more values of one or more weighting factors of said one or more neural networks.

Once the retraining has completed and an updated trained machine-learning algorithm is generated in block 603, the computing device stores, in block 604, the updated trained machine-learning algorithm to machine-learning database. Subsequently, the computing system may employ said updated trained machine-learning algorithm for quality prediction (e.g., according to any of the above embodiments). In the illustrated embodiment, it is assumed that the updating of the trained machine-learning algorithm is repeated once new set(s) of history data is received (as described above in relation to block 601) and thus the process proceeds from block 604 back to block 601.

Referring to FIG. 6B, actions pertaining to blocks 611, 612, 614 may correspond fully to actions described above in relation to blocks 601, 602, 604 of FIG. 6A and are thus not repeated here for brevity. In other words, the difference between the two illustrated processes lies solely (or predominantly) in the training step illustrated with blocks 603, 613. While block 603 of FIG. 6A related to fine-tuning the existing trained machine-learning algorithm, the computing system generating, in block 613, an updated trained machine-learning algorithm by initializing a new machine-learning algorithm for calculating expected values of the one or more quality metrics based on values of the one or more production process parameters and training this new machine-learning algorithm using at least the one or more sets of history data (possibly also using other history data maintained in the history database). In other words, the training is essentially restarted "from scratch". Thus, the generation of the updated machine-learning algorithm in block 613 may be carried out in a similar manner as described for the initial generation of the trained machine-learning algorithm, that is, as described in relation to block 303 of FIG. 3 (though obviously using a different set or sets of history data as input). This type of updating of the machine-learning algorithm may enable more drastic changes to the machine-learning algorithm compared to the process of block 603 of FIG. 6A. For example, the process of FIG. 6B may lead to an updated trained machine-learning algorithm having a different topology (e.g., a different topology for one or more neural networks) compared to the previous trained machine-learning algorithm, as opposed to, e.g., only causing changes to weighting factors of the one or more neural networks. Therefore, if it is noticed that the predictions produced by the trained machine-learning algorithm are no longer dependable even despite of periodic retraining efforts according to FIG. 6A, the process of FIG. 6B may be carried out so as to generate a restructured trained machine-learning algorithm which is more suitable for the prediction of the quality of the fiber optic cable currently produced by the secondary coating line. In the illustrated embodiment of FIG. 6B in contrast to the embodiment illustrated in FIG. 6A, it is assumed that the generating of a new trained machine-learning algorithm is not automatically repeated (i.e., the process terminates in block 614).

The retraining performed by the computing system according to FIGS. 6A and/or 6B may be manual, semi-automatic or fully automatic. Most typically, the computing system may perform the retraining semi-automatically, meaning the history data (comprising corresponding quality and production process data) from offline measurements is collected continuously, but the trained machine learning model is retrained according to FIGS. 6A and/or 6B periodically or on a need basis. Triggering the retraining on a need bases may comprise, e.g., triggering the retraining upon receiving a request received a user device, where the user device may transmit said request upon receiving a pre-defined user input via a user input device of the user device. The computing system may, alternatively, be programmed to be fully automatic so that the trained machine-learning algorithm is updated, e.g., weekly using all the new history data that is available (that is, all the data which has been collected since the last update). The nature of the fiber optic cable production using a secondary coating line is such that there are reel changes and line stops occurring multiple times per day. These breaks or interruptions in the production may be used for loading the updated machine-learning model for use (and possibly also for generating the updated trained machine-learning algorithm).

Training and/or retraining of the computing system according to embodiments may be supervised or unsupervised. In supervised learning, a set of history data (comprising quality data and production process data) is used for training the machine-learning algorithm to produce a desired calculation result with certain production process data as input. In unsupervised training, the computing system itself tries to classify the data into a certain number of feature groups. The feature groups may or may not correspond to the aforementioned quality classes which may be communicated to the user. The quality data may be used to verify how well the unsupervised learning has managed to differentiate feature groups, but it is not actively used in the machine-learning training. For example, multilayer perceptron networks may be trained in a supervised manner, whereas training of self-organized maps may be unsupervised.

Figure 7:
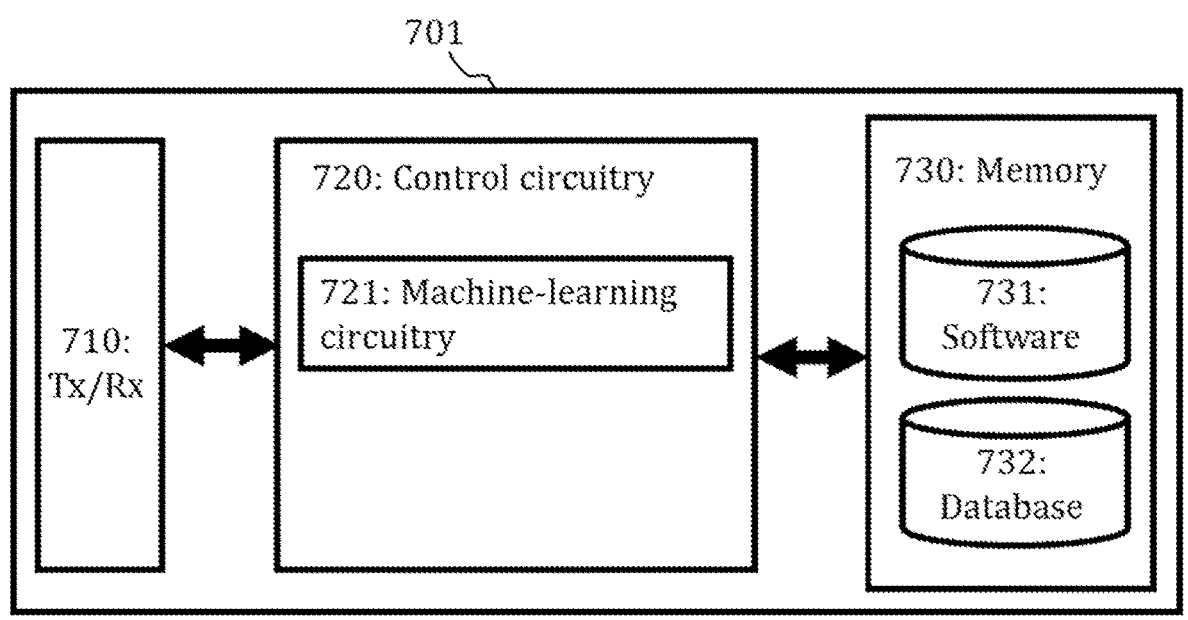
FIG. 7 illustrates an apparatus according to embodiments.

FIG. 7 illustrates an apparatus 701 configured to perform the functions described above in connection with a computing system such as the computing system 117 shown in FIG. 1 or with a computing device such as the first computing device 111 of the computing system 117 in FIG. 1. The apparatus may be an electronic device comprising electronic circuitries. The apparatus may be a separate (network) entity or a plurality of separate entities. The apparatus may comprise a control circuitry 720, such as at least one processor, and at least one memory 730 including a computer program code (software) 731 wherein the at least one memory and the computer program code (software) are configured, with the at least one processor, to cause the apparatus to perform any one of the embodiments of the computing system described above.

The memory 730 may comprise at least one database 732. Said at least one database 732 may comprise at least the machine-learning database and/or the history database as described in relation to above embodiments. In other embodiments, one or both of the machine-learning database and the history database as described in relation to embodiments may be external databases or database servers accessible by the apparatus 701 via the communication interfaces 710. The memory 730 may also comprise other databases (e.g., a database for maintaining at least monitored production process parameters) which may or may not be related to the described quality prediction functionalities according to embodiments.

Referring to FIG. 7, the control circuitry 720 may comprise machine-learning circuitry 721 configured to provide the apparatus functionalities for predicting quality (or specifically one or more quality metrics) of the manufactured (loose tube) fiber optic cable and optionally providing results of the predicting to a user device according to any of presented embodiments. Optionally, the machine-learning circuitry 721 may also be configured to cause adjusting of one or more control parameters of the secondary coating line. For example, the machine-learning circuitry 721 may be configured to perform at least some of processes of FIGS. 1 to 4, 6A and 6B and/or some of processes performed by the computing system in FIG. 5. In some other embodiments, the control circuitry 720 may be divided into two or more individual circuitry.

The apparatus 701 may further comprise (communication) interfaces 710 comprising hardware and/or software for realizing communication connectivity according to one or more communication protocols. The communication interface may provide the apparatus with communication capabilities to communicate, for example, with one or more user devices, a process supervisory unit for a secondary coating line and/or one or more external databases or database servers. The one or more communication interfaces 710 may provide the apparatus 701 with communication capabilities to communicate in a cellular communication system and enable communication with one or more network nodes and one or more terminal devices.

The communication interface 710 may comprise standard well-known components such as an amplifier, filter, frequency-converter, (de)modulator, and encoder/decoder circuitries and one or more antennas.

The memory 730 of the apparatus 701 described in relation to FIG. 7 may be implemented using any suitable data storage technology, such as semi-conductor-based memory devices, flash memory, magnetic memory devices and systems, optical memory devices and systems, fixed memory and removable memory.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2 to 5, 6A and 6B may be carried out by an apparatus comprising corresponding means for performing at least some of the described processes Some example means for carrying out the processes may include at least one of the following: detector, processor (including dual-core and multiple-core processors), microprocessor, digital signal processor (DSP), controller, microcontroller, receiver, transmitter, encoder, decoder, memory, RAM, ROM, software, firmware, display, user interface, display circuitry, user interface circuitry, user interface software, display software, circuit, antenna, antenna circuitry, application-specific integrated circuit (ASIC), digital signal processing device (DSPD), programmable logic device (PLD) and field programmable gate array (FPGA). For firmware or software, the implementations according embodiments may be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. In an embodiment, the at least one processor, the memory, and the computer program code form processing means or comprises one or more computer program code portions for carrying out one or more operations according to any one of the embodiments of FIGS. 2 to 5, 6A and 6B or operations thereof.

Embodiments as described may also be carried out in the form of a computer process defined by a computer program or portions thereof. Embodiments of the methods described in connection with FIGS. 2 to 5, 6A and 6B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for performing the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as the technology advances, the inventive concept can be implemented in various ways. The invention and its embodiments are not limited to the examples described above but may vary within the scope of the claims.

The invention claimed is:

1. A method for monitoring and controlling quality of loose tube fiber optic cable during manufacture in a secondary coating line, the method comprising:
   maintaining, in a machine-learning database, a trained machine-learning algorithm for calculating expected values of one or more quality metrics of the loose tube fiber optic cable manufactured in the secondary coating line based on values of one or more production process parameters of the secondary coating line;
   monitoring, by a computing system, one or more values of the one or more production process parameters of the secondary coating line during running of the secondary coating line;
   calculating, by the computing system, in real-time during the monitoring, one or more expected values of the one or more quality metrics using the trained machine-learning algorithm, wherein monitored values of the one or more production process parameters are used as an input of the trained machine-learning algorithm;
   outputting, by the computing system, at least the one or more expected values of the one or more quality metrics to a user device; and,
   causing, by the computing system, adjusting, in real-time during the monitoring, the one or more process parameters to match the one or more expected values of the one or more process parameters.

2. The method according to claim 1, wherein the outputting of at least the one or more expected values of the one or more quality metrics to the user device comprises:
   causing, by the computing system, displaying the one or more expected values of the one or more quality metrics on a screen of the user device in real-time for guiding a user of the user device in managing the secondary coating line.

3. The method according to claim 2, wherein the outputting of at least the one or more expected values of the one or more quality metrics to the user device further comprises:
   causing, by the computing system, displaying the one or more values of the one or more production process parameters of the secondary coating line on the screen of the user device in real-time for guiding a user of the user device in managing the secondary coating line.

4. The method according to claim 1, wherein the secondary coating line is run according to one or more control parameters of the secondary coating line, the method further comprising:
   calculating, by the computing system, in real-time during the monitoring, one or more optimal values of the one or more control parameters for improving quality of the loose tube fiber optic cable being manufactured as defined by the one or more expected values of the one or more quality metrics; and
   causing, by the computing system, adjusting, in real-time during the monitoring, the one or more control parameters to match the one or more optimal values of the one or more control parameters.

5. The method according to claim 1, wherein the secondary coating line is run according to one or more control parameters of the secondary coating line, the method further comprising:
   calculating, by the computing system, in real-time during the monitoring, one or more optimal values of the one or more control parameters for improving quality of the loose tube fiber optic cable being manufactured as defined by the one or more expected values of the one or more quality metrics; and
   causing, by the computing system, displaying, in response to the calculating the one or more optimal values for the one or more control parameters, a prompt for changing one or more current values of the one or more control parameters to match the one or more optimal values for the one or more control parameters on a screen of a user device.

6. A method for monitoring and controlling quality of loose tube fiber optic cable during manufacture in a secondary coating line, the method comprising:
   maintaining, in a machine-learning database, a trained machine-learning algorithm for calculating expected values of one or more quality metrics of the loose tube fiber optic cable manufactured in the secondary coating line based on values of one or more production process parameters of the secondary coating line;
   monitoring, by a computing system, one or more values of the one or more production process parameters of the secondary coating line during running of the secondary coating line;
   calculating, by the computing system, in real-time during the monitoring, one or more expected values of the one or more quality metrics using the trained machine-learning algorithm, wherein monitored values of the one or more production process parameters are used as an input of the trained machine-learning algorithm;

calculating, in real-time during the monitoring, one or more optimal values of one or more control parameters of the secondary coating line for improving quality of the loose tube fiber optic cable being manufactured as defined by the one or more expected values of the one or more quality metrics; and causing adjusting, in real-time during the monitoring, the one or more control parameters of the secondary coating line to match the one or more optimal values of the one or more control parameters.

7. The method according to claim 6, wherein the one or more control parameters of the secondary coating line comprise one or more control parameters of one or more actuators running the secondary coating line and/or one or more control parameters of other elements in the secondary coating line, said one or more control parameters of the one or more actuators comprising, for each of the one or more actuators, at least one of voltage, current, power and frequency of a control signal fed to a corresponding actuator and said one or more control parameters of said other elements in the secondary coating line comprising one or more temperatures of one or more respective extruders, a temperature of cooling water, a line tension and a fiber pay-off tension.

8. The method according to claim 6, further comprising generating the trained machine-learning algorithm by performing:

maintaining, in a history database, history data comprising quality data for loose tube fiber optic cable previously manufactured using one of the secondary coating line and another secondary coating line and production process data of the same secondary coating line acquired during manufacturing of said loose tube fiber optic cable, wherein the quality data comprises a plurality of measured values for each of one or more quality metrics and the production process data comprises a plurality of measured values for each of the one or more production process parameters of said one of the secondary coating line and another secondary coating lin line;

initializing, by the computing system, a machine-learning algorithm for calculating expected values of the one or more quality metrics based on values of the one or more production process parameters;

training, by the computing system, the machine-learning algorithm using the history data; and storing, by the computing system, the trained machine-learning algorithm to the machine-learning database.

9. The method according to claim 8, further comprising:

receiving, by the computing system, one or more sets of history data via an external interface of the computing system, wherein each set of history data comprises quality data for loose tube fiber optic cable previously manufactured using one of the secondary coating line and another secondary coating line and production process data of the same secondary coating line acquired during manufacturing of said loose tube fiber optic cable, wherein the quality data comprises a plurality of measured values for each of the one or more quality metrics and the production process data comprises a plurality of measured values for each of the one or more production process parameters of said one of the secondary coating line and another secondary coating line;

generating, by the computing system, an updated trained machine-learning algorithm by retraining the trained machine-learning algorithm using the one or more sets of history data using the trained machine-learning algorithm as a starting point for the retraining or initializing a new machine-learning algorithm for calculating expected values of the one or more quality metrics based on values of the one or more production process parameters and training the new machine-learning algorithm using at least the one or more sets of history data; and storing, by the computing system, the updated trained machine-learning algorithm to the machine-learning database.

10. The method according to claim 8, wherein the monitoring and all of the calculating during the monitoring are performed by a first computing device of the computing system and the generating of the trained machine learning algorithm is performed by a second computing device of the computing system.

11. The method according to claim 6, wherein the trained machine learning algorithm is based on one or more feed forward neural networks, one or more recurrent neural networks, a Bayesian classifier, a self-organizing map or a combination thereof.

12. The method according to claim 11, wherein the trained machine learning algorithm is based at least on the one or more feed forward neural networks comprising one or more multi-level perceptron networks and/or one or more convolutional neural networks and/or on the one or more recurrent neural networks comprising one or more long-short term memories and/or one or more recurrent convolutional neural networks.

13. The method according to claim 6, wherein the one or more quality metrics comprise one or more of excess fiber length, tube shrinkage and light attenuation in a fiber optic cable.

14. The method according to claim 6, wherein the one or more quality metrics comprise an overall quality metric or an overall quality class indicating overall quality of the manufactured loose tube fiber optic cable.

15. The method according to claim 6, wherein the secondary coating line comprises a compression caterpillar and the one or more production process parameters comprise one or more of the following: speed of compression caterpillar, tension of the compression caterpillar, torque of a motor of the compression caterpillar, a standard deviation of the speed of the compression caterpillar over a pre-defined amount of time, a standard deviation of the tension of the compression caterpillar over a pre-defined amount of time and a standard deviation of the torque of the motor of the compression caterpillar over a pre-defined amount of time.

16. The method according to claim 15, wherein the secondary coating line comprises a middle capstan following the compression caterpillar and the one or more production process parameters comprise torque of a motor of a middle capstan and/or a standard deviation of the torque of the motor of the middle capstan over a pre-defined amount of time.

17. An apparatus comprising means for performing a method according to claim 6.

18. A non-transitory computer readable media having stored thereon instructions that, when executed by a computing device, cause the computing device to perform a method according to claim 6.

19. A control system for a secondary coating line, the control system comprising:
- a computing system configured to perform a method according to claim 6;
- a user device comprising at least a screen and a user input device, the user device being connected to the computing system via a communications link;
- a programmable logic controller, PLC, automation system configured at least to monitor production process parameters of the secondary coating line and adjust control parameters of the secondary coating line; and
- a process supervisory unit, PSU, connected, via communications links, between the computing system and the PLC automation system and between the user device and the PLC automation system, the PSU being configured to relay monitored production process parameters from the PLC automation system to the computing system and the user device and to relay control signaling from the computing system and the user device to the PLC automation system.

* * * * *